(12) United States Patent
Vazvan

(10) Patent No.: US 6,324,394 B1
(45) Date of Patent: Nov. 27, 2001

(54) MOBILE TELECOMMUNICATION SUBSCRIBER SYSTEM IN A MULTI-OPERATOR ENVIRONMENT

(75) Inventor: Behruz Vazvan, Espoo (FI)

(73) Assignee: OY Nokia AB, Helsinki (FI)

( * ) Notice: Subject to any disclaimer, the term of this patent is extended or adjusted under 35 U.S.C. 154(b) by 0 days.

(21) Appl. No.: 08/945,860

(22) PCT Filed: May 7, 1996

(86) PCT No.: PCT/FI96/00257

§ 371 Date: Mar. 12, 1998

§ 102(e) Date: Mar. 12, 1998

(87) PCT Pub. No.: WO96/36192

PCT Pub. Date: Nov. 14, 1996

(Under 37 CFR 1.47)

(30) Foreign Application Priority Data

May 8, 1995 (FI) .......................................................... 952212

(51) Int. Cl.[7] ...................................................... H04B 7/00
(52) U.S. Cl. ............................................ 455/406; 455/433
(58) Field of Search .................................... 455/406, 407, 455/408, 410, 411, 433, 435, 445; 379/111, 112, 113, 114, 140

(56) References Cited

U.S. PATENT DOCUMENTS 5,862,471 * 1/1999 Tiedemann, Jr. et al. ............ 455/406

6,047,179 * 4/2000 Kirby .................................... 455/406

FOREIGN PATENT DOCUMENTS

| 264023 | 4/1988 | (EP) . |
| 0 698 987 A2 | 2/1996 | (EP) . |
| WO 95/01069 | 1/1995 | (WO) . |

OTHER PUBLICATIONS

A. Akiyama, "Pre–Paid System Using Portable Terminal Equipment", Patent Abstracts of Japan, 18(397):E–1583 (1994).

* cited by examiner

Primary Examiner—Thanh Cong Le
(74) Attorney, Agent, or Firm—Pillsbury Winthrop

(57) ABSTRACT

The invention relates to a system for monitoring mobile telecommunications in a multi-operator environment. The system of the invention comprises at least one user control station (UCS) comprising a home location register (HLR) containing a unique subscription number (USN) and other required subscriber data, and an account control unit (ACU) containing the subscriber's credit information. The home location register (HLR) and the account control unit (ACU) are interconnected in order for the home location register (HLR) to be able to check the credit information of the calling subscribers in response to requests from the network operators and correspondingly to debit the subscribers' accounts on behalf of the operators by the charge of the calls made. The invention is characterized in that the visitor location register (VLR) or the user control station (UCS) can allocate several temporary numbers (TN) to each terminal.

17 Claims, 5 Drawing Sheets

MOBILE TELECOMMUNICATION SUBSCRIBER SYSTEM IN A MULTI-OPERATOR ENVIRONMENT

BACKGROUND

The invention relates to a system for monitoring mobile telecommunication in a multioperator environment.

Mobile telecommunication has grown rapidly. Its users should have free access to all mobile networks, and the operators need the possibility of real-time billing. In addition, the demand for total subscriber mobility requires advanced and new solutions for both mobile users and operators.

The UPT (Universal Personal Telecommunications)—an ITU (International Telecommunications Union) definition—requires the use of a unique, personal and network-independent number for fixed or mobile users of telecommunication systems by the year 2000. The main object of the UPT (sometimes referred to as personal communication services) is that any user can be connected to another user through different networks by means of any terminal, either mobile or fixed. Until now there has been no technical or concrete solution by which the objects of the UPT would have been achieved.

At present, fixed and cellular networks require an operator-specific subscriber number which is stored in distributed databases. Each user is thus bound to a certain operator, and when the user roams from a (network service) area or a country to another, his operator should have a roaming agreement with other operators to allow the user to have access to the relevant mobile communication networks. This object is naturally achieved if there are such agreements between the operators; in the end, this incurs extra costs to the end user. A subscriber of a mobile communication network and also a subscriber of a fixed telephone network thus have a limited choice of operators, since they have fixed subscriptions. This means that although mobile subscribers use cordless telecommunication, they cannot freely select the most optimal network from among all possible networks. The mobility advantages of mobile telephone systems have thus not been fully achieved.

In the present world of telecommunication, the term subscriber or subscription brings to mind, more or less, club membership. Today, telecommunication users must be members or clients and pay a monthly membership fee to an operator in order to be able to buy communication services and in order to enable the operators to charge the users. In the future, the role of banks will be emphasized in telecommunication. The current subscription system is an obstacle to the implementation of UPT-type concepts, and so far there has been no mechanism which could have provided the users with free access to the network of any operator.

In the current real-time billing concepts of mobile communication systems (mostly used for rental cars), the user must insert his/her credit card or credit card information (i.e. the credit card number, expiration date and a personal security code) in the mobile terminal so that the terminal can be registered in the network. This information is transferred to a credit card clearing house to obtain the credit card verification for registration. In such systems, the user must have a credit card. In telecommunication systems, most of the users are normal users who have no credit cards. However, in such solutions, credit card information must be used in the communication between the users, operators and credit card clearing houses.

SUMMARY

The present invention provides an innovative solution for implementing a UPT-type system. The objects of the UPT are achieved with the claimed UMSS (Universal Mobile Subscription System) by slightly modifying the current GSM network architecture and by allowing thus the GSM system to fully assume the role of the UPT.

This new type of system for monitoring mobile telecommunication in a multioperator environment is achieved with the system of the invention, which is characterized in that the system comprises at least one user control station comprising a home location register containing a unique subscription number and other required subscriber data, and an account control unit containing the subscriber's credit information, the home location register and the account control unit being interconnected in order for the home location register to be able to check the credit information of the calling subscribers in response to requests from the network operators and correspondingly to debit the subscribers' accounts on behalf of the operators by the charge of the calls made.

The implementation of free access to all networks (operators) requires a number of distributed databases, and it is difficult to define which operator should own them. On the other hand, operators do not have authority to act as banks, i.e. to store the clients' account information in order to implement a real-time billing system. The UMSS architecture of the present invention replaces the operator-specific subscription by using a unique subscription number USN (universal subscription number), which is accepted by all operators and by which the users may simultaneously use several telephone connections (frequency channels) and have free access to any available network. The UMSS thus provides the operators with the possibility of charging the clients in real time.

The universal mobile subscription system UMSS has the following advantages:
  Free access to both local and universal services anywhere and any time.
  Free subscriber mobility without any need for operator-specific roaming procedures.
  Free use of available services with only one universal number.

In the UMSS, there is no boundary between networks providing dual coverage or multicoverage over the same area. This means that a user may select any available operator without that the different operators have a roaming agreement.

The UMSS provides a new concept of mobility based on the solutions according to the present invention. The basic requirement in universal contexts (e.g. UPT) is that end users should be free to select any available operator anywhere and any time regardless of the subscriber's origin. When a subscriber travels from one area to another (mobility), for example, he may use the same services at different rates. In a certain area, one may choose a better or the same service at lower rates than in one's home area. In mobile communication, it should also be possible to use an operator without any extra charges resulting e.g. from operator-specific roaming fees or the like. In the UMSS, the end user is not bound to one network/operator, and hence even fixed subscribers are mobile due to the USN. A fixed subscriber can also act as a mobile subscriber by entering (dialling) his S-USN (secret USN) code in any fixed terminal which can have access to the desired network after the operator has checked the subscriber data.

The most desirable property from the operators' point of view is that, when buying services, the users would immediately pay in cash, which would be very efficient and advantageous both for the operators and for the end users. In the UMSS, this is achieved with a real-time charging procedure essentially different from the solutions introduced so far. The user does not necessarily need even a credit card, since in the UMSS, only the USN, which is linked with the user's bank account, is used in the communication between the user, operator and banks.

To achieve the advantages of total mobility, it is necessary to take into account the users' need to have free access to all available networks in real time. The UMSS is a concept which does not require a subscription, since the users do not have operator-specific subscriber numbers.

DESCRIPTION OF THE DRAWINGS

In the following, the invention will be described in greater detail with reference to the accompanying drawings, in which

FIG. 1 shows the general signalling architecture of the universal mobile subscription system (UMSS). A satellite operator may serve all terrestrial networks by offering universal mobile communication services, or it may be a separate stand-alone system.

FIG. 2 shows the general architecture of the universal mobile subscription system (UMSS), in which two banks (HLR), both of which have a number of universal subscribers, are linked with the UMSS signalling protocol. The users are charged immediately after each call, and the amount to be charged is withdrawn from the users' accounts in real time or often after calls made within a certain period of time. The operators are paid for the services offered immediately after one or more calls. The amount to be paid can be paid directly from the user's account to the operator's account, or the bank can pay in advance on behalf of the client when the client has credit in the bank. The sender bank is the bank in which the calling user has a telephone account, and the receiver bank is the bank in which the called user has an account.

FIG. 3a shows an information flow chart according to the UMSS concept when credit cards or SIIM card data with the S-USN and IA are used. It should be noted that the procedure illustrated is only one of the scenarios according to the UMSS concept. A mobile terminal, for example, can give only the S-USN number to the operator.

FIG. 3b shows an information flow chart according to the UMSS concept when CCM cards are used. A CCM user can receive incoming calls all the time, but outgoing calls are limited to the number of prepaid minutes contained in the CCM card. CCM users also have USN numbers stored in the home location register HLR of the bank. A CCM card can be recharged with a limited calling time by paying a desired sum to the bank.

FIG. 3c shows a registration procedure according to the UMSS concept. The HLR of the bank can also assign the TN number, if desired. The VLR of operator A can also be regarded as the VLR of the satellite operator. Similarly, the HLR of the bank can be considered the user's home operator. This registration procedure replaces conventional registration procedures in which all user information needed by the network is stored in a SIM card.

FIG. 3d shows the registration of the same user as in FIG. 3c, the difference being that in this figure the user has a second terminal, e.g. for telefax services.

FIG. 3e shows the routing of calls between operators according to the UMSS concept. Each TN (in the HLR of the bank) consists of the operator code (e.g. 940) and the user's temporary number (e.g. 465192). The TNs are for incoming calls. It should be observed that operator B may request the bank to charge user B instead of user A for the routing of incoming calls, e.g. in the case of the GSM system.

FIG. 3f shows the change of operator (domain) according to the UMSS concept. A mobile terminal or user selects a new available network when moving from one service area to another. Thereafter the new operator (domain) information is updated in the user control station UCS in the HLR of the bank because of this change, and the mobile terminal receives a new TN. Handover can be considered to be a procedure between networks (i.e. operators) in which a mobile terminal re-establishes the call to the same destination.

DETAILED DESCRIPTION

Figure 1:
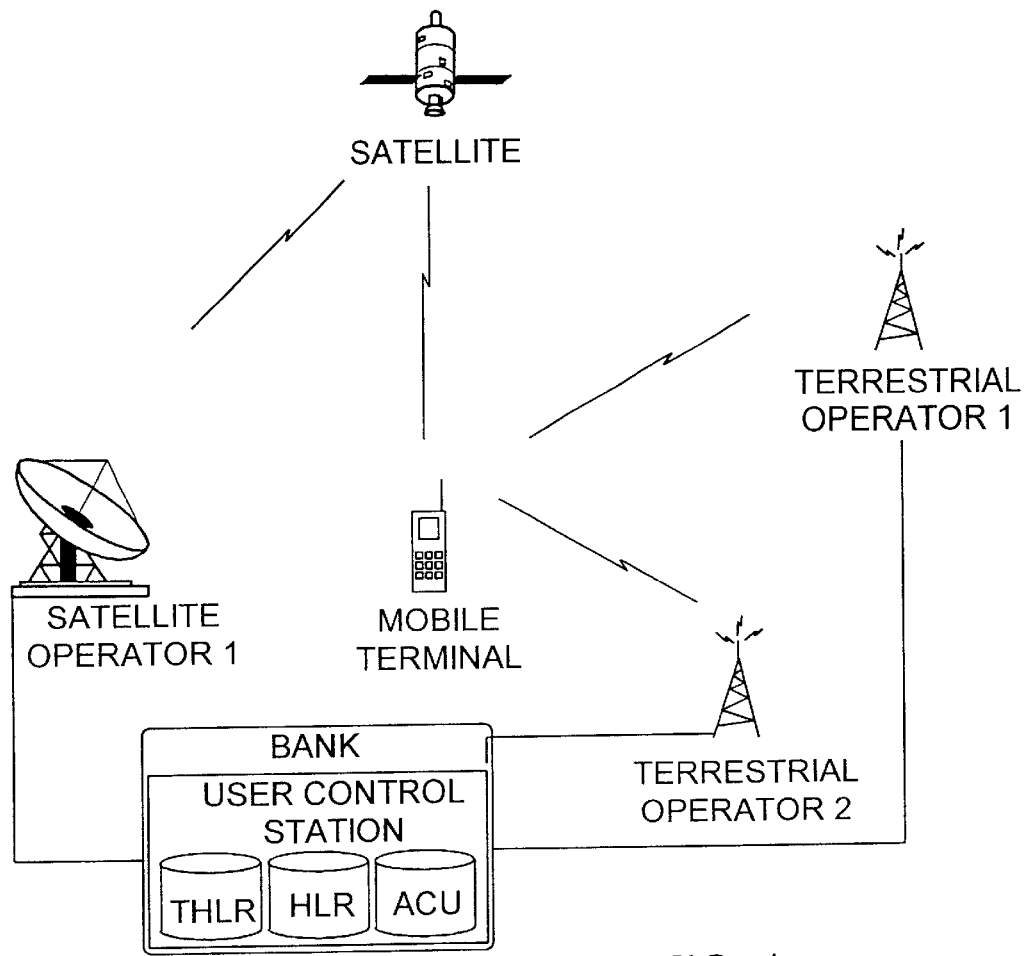
FIG. 1 shows the general signalling architecture of the universal mobile subscription system (UMSS)
Figure 3C:
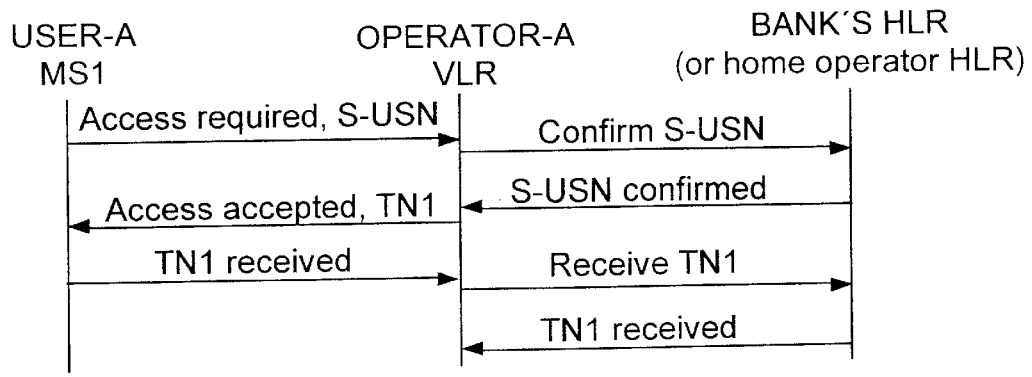
FIG. 3c shows a registration procedure according to the UMSS concept.
Figure 2:
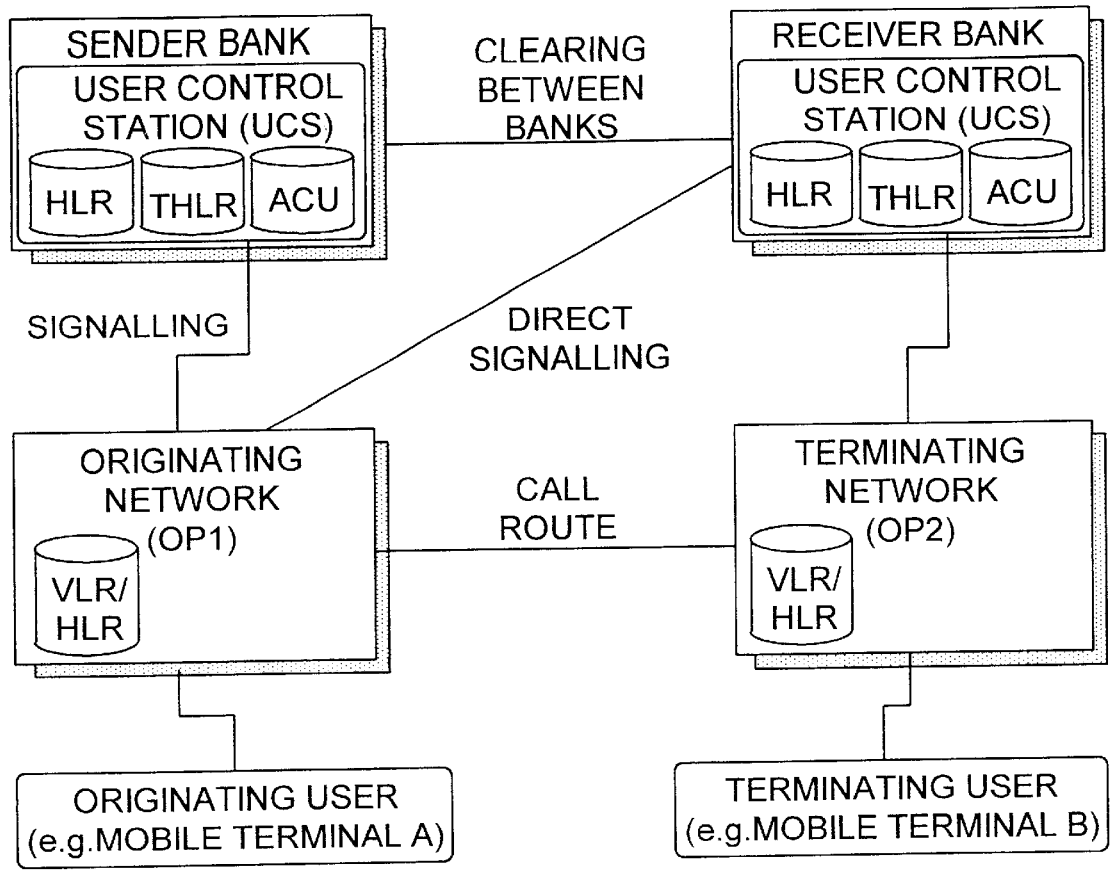
FIG. 2 shows the general architecture of the universal mobile subscription system (UMSS), in which two banks (HLR), both of which have a number of universal subscribers, are linked with the UMSS signalling protocol.

FIG. 1 is a general illustration of the UMSS architecture, which can be achieved with minor modifications in the architecture of the present mobile networks. The HLR (Home Location Register) is located in a bank where the mobile user has an account (FIGS. 1 and 2). In the registration procedure (FIG. 3), a mobile terminal provides the operator with its invoicing address (IA) and/or only the USN (which is connected to the user's bank account number). Then the operator, visitor location register VLR, requests the bank to confirm this/these data. After the bank, HLR, has confirmed the user information, the user can be registered in the network by receiving a temporary number (TN) which will be stored in the relevant mobile (or fixed) terminal for incoming calls, and which will be used for roaming between a network operator and the home location register HLR. The visitor location register of the network also assigns a temporary number TN to a temporary home location register THLR. This TN concept enables the mobile users to have access from different mobile terminals (e.g. telephone, PDA, etc.) using only a unique subscriber number USN, which can be incorporated in the subscriber's smart card or which the subscribers can simply enter (by dialling) in each terminal they use. In the latter case, the USN for outgoing calls can be different from the USN for incoming calls; in other words, the users have a public USN (P-USN) for incoming calls and a secret USN (S-USN) for outgoing calls. Each USN consists of the operator code (e.g. 940-) and the user's permanent number, whereas each TN consists of the operator code (e.g. 940-) and the user's temporary number allocated to him for use within the service area of that operator. When a subscriber uses another terminal simultaneously for other purposes, the network allocates another temporary number for this terminal. The subscriber is thus allowed to have two or more temporary numbers although he has only one subscription. When the call is finished, the operator's visitor location register VLR informs the home location register HLR of the bank to this effect. The operator's VLR/HLR contains the addresses of all the banks in which the subscribers of the UMSS may have an account for telecommunication services (i.e. the USN is connected to that account). If the user or the mobile terminal selects another network, a new TN is allocated to it by the new operator, whereafter the previous TN can be deleted from the previous visitor location register VLR (belonging to another operator) and from the memory of the mobile terminal. The user does not even need to know the TN allocated to him by the network. On the other hand, the operator has the possibility of charging the subscribers' bank accounts directly in real time. The HLR is connected to an account control unit ACU, which checks the clients' credit. If there is no credit or the account is heavily overdrawn, the network is informed about this, whereafter it will be able to estimate whether it should accept the mobile user's registration attempt or not. This procedure gives the (mobile services) operators a possibility of selling their services in real time for cash. After the originating network has confirmed the IA and credit information of the A-subscriber by sending the user's USN (and IA) to the user's bank, the A-subscriber's network (operator 1) requests the code of the terminating network (operator 2) and the TN of the terminating B-subscriber from the receiver bank for incoming calls. In this case, it is assumed that both users have their accounts in the same bank. The home location register HLR of the bank is aware of the terminating user's (B-subscriber) TN (FIG. 3a) and operating network; the HLR informs the originating network about this. Operator 2 is therefore able to charge the A-subscribers in real time for routing a call to the B-subscriber. This means that the operators do not need to charge each other for incoming and outgoing calls, but each operator will charge the end user directly. The telecommunication connections between the operators' visitor location registers VLR and the home location register HLR of the bank (i.e. the user control station UCS) form a signalling network so that after the question-answer procedure between the originating network (operator 1) and the UCS, the calls can be routed directly from the originating network to the terminating network (operator 2). The HLR also comprises an AuC (Authentication Center) and an EIR (Equipment Identity Register) as sub-databases of the HLR. An operator's VLR/HLR can be combined. A mobile station MS informs the operator's VLR/HLR for location updating.

In the case of different banks, each of which has a number of clients with USNs, the receiver bank charges the originating user (A-subscriber) through the sender bank (A-subscriber's bank) for incoming calls to the terminating network (operator). In this case, the charged amount is transferred to the terminating operator's account in real time. The banks can clear their debts either in real time or later on. This is an electric letter of credit LC. In the UMSS, there is no need for roaming between operators. The roaming signalling takes place only between the operator's VLR and the HLR of the bank. The operator's HLR contains only bank information, i.e. the addresses of the banks where the users have their S-USNs connected to their own (telephone) accounts for telecommunication services. The S-USN is not stored in the operator's HLR, but all user information and the S-USN are stored in the HLR of the bank. The UMSS is therefore a concept which is independent of subscriptions and in which the users have no operator-specific subscription numbers.

When a user in the UMSS is registered by means of one terminal in a network (e.g. for incoming and outgoing calls) and by means of another terminal (e.g. for telefax messages) in another network or the same network, the user is assigned two TNs (FIGS. 3c and 3d): one for each terminal or service (e.g. telephone or telefax service or the like) . In reality, TNs are transparent to the user, and only the terminal and the network use them for temporary identification. This means that after receiving confirmation of the user's S-USN (and credits) from the bank, the operator assigns a temporary number TN1 to the terminal in use. If the user uses another terminal (e.g. for telefax services) giving his S-USN (which can be dialled or even given using a SIIM, CCM or credit card), the network (VLR) assigns another temporary number TN2 to the same user and sends it to the terminal in question (in the case of a different operator, the bank is requested again to confirm the USN). When a telephone call is made to this user, it is routed to TN1, whereas incoming telefax messages are routed to TN2, since the network is aware of the TNs allocated to each terminal and service. There may be several TNs for one user (preferably a user who has a bank account, for real-time charging). A family, for example, may have one account for all their USNs. The user's account can therefore be debited for all bills in real time. The TNs are operator-specific and they can be changed continually because the user registers in another network or deregisters from a previous network after a while, whereas the USN is allocated to one user and remains always the same unless the users change their bank or account information (credit card or SIIM card). However, a user may use several SIIM/SIM cards for paying for his own telecommunication services, but each one contains the USN which (in conjunction with a secret code) is connected to the user's bank account number.

The TN concept of the present invention can, however, be applied to the current mobile communication networks; it is thus possible that a user has only one telephone number (i.e. USN), which can be operator specific, but the network (e.g. MSC in the case of GSM) allocates two or more TNs for different services. In the mobile services switching centre (MSC), a call is routed to e.g. TN1, while telefaxes (which the MSC identifies on the basis of the voice frequency signal of the telefax) are routed to TN2.

Figure 3D:
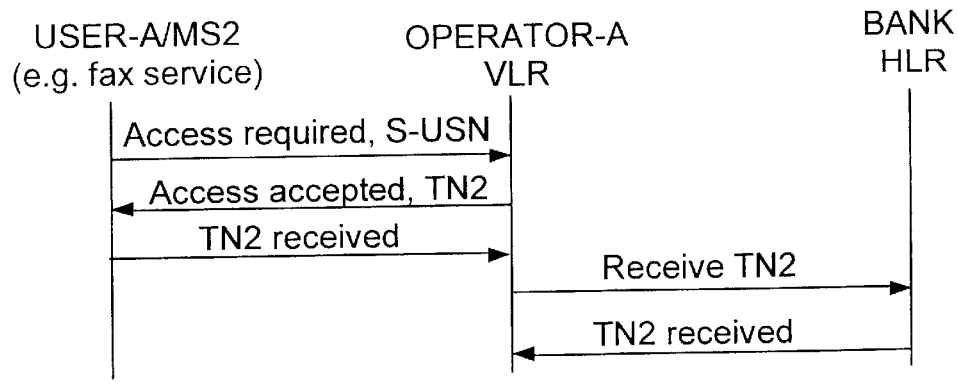
FIG. 3d shows a registration procedure according to the UMSS concept of a user's other terminal.
Figure 3A:
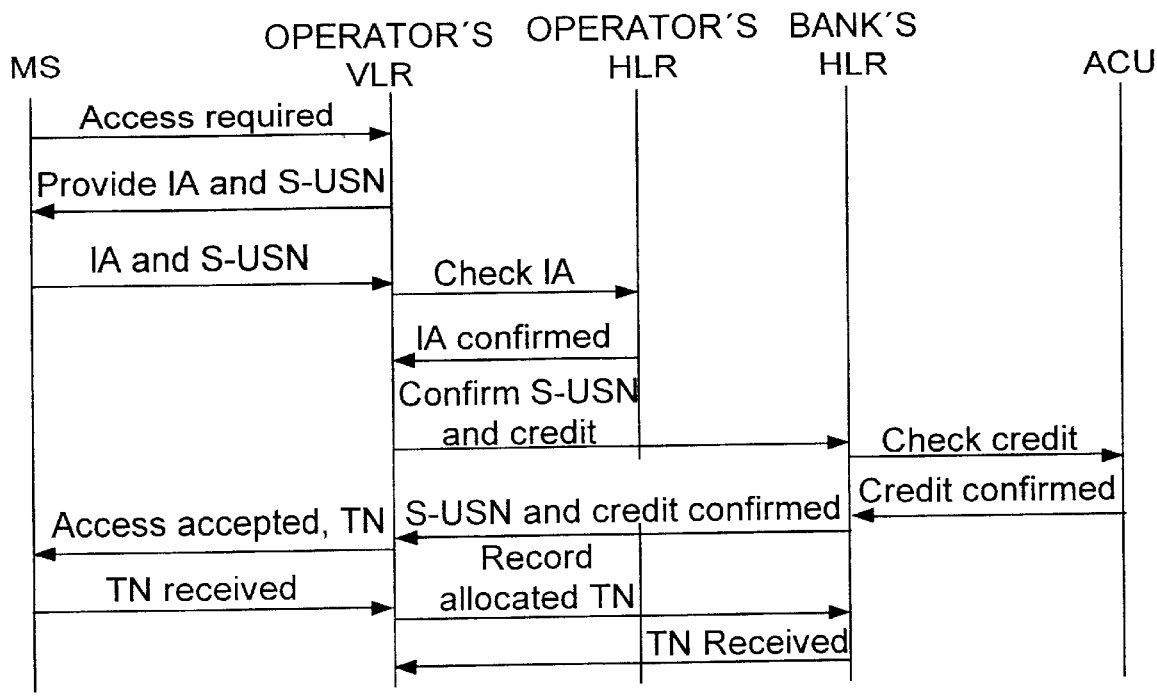
FIG. 3a shows an information flow chart according to the UMSS concept when credit cards or SIIM card data with the S-USN and IA are used.
Figure 3B:
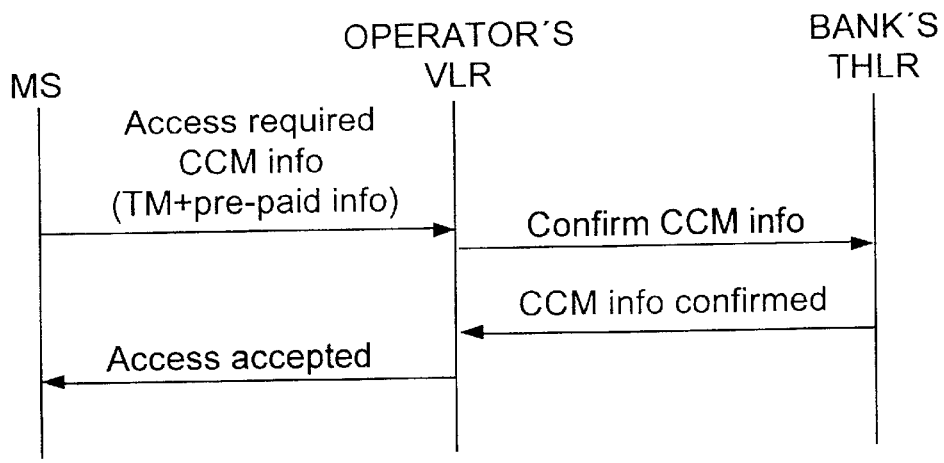
FIG. 3b shows an information flow chart according to the UMSS concept when CCM cards are used.
Figure 3E:
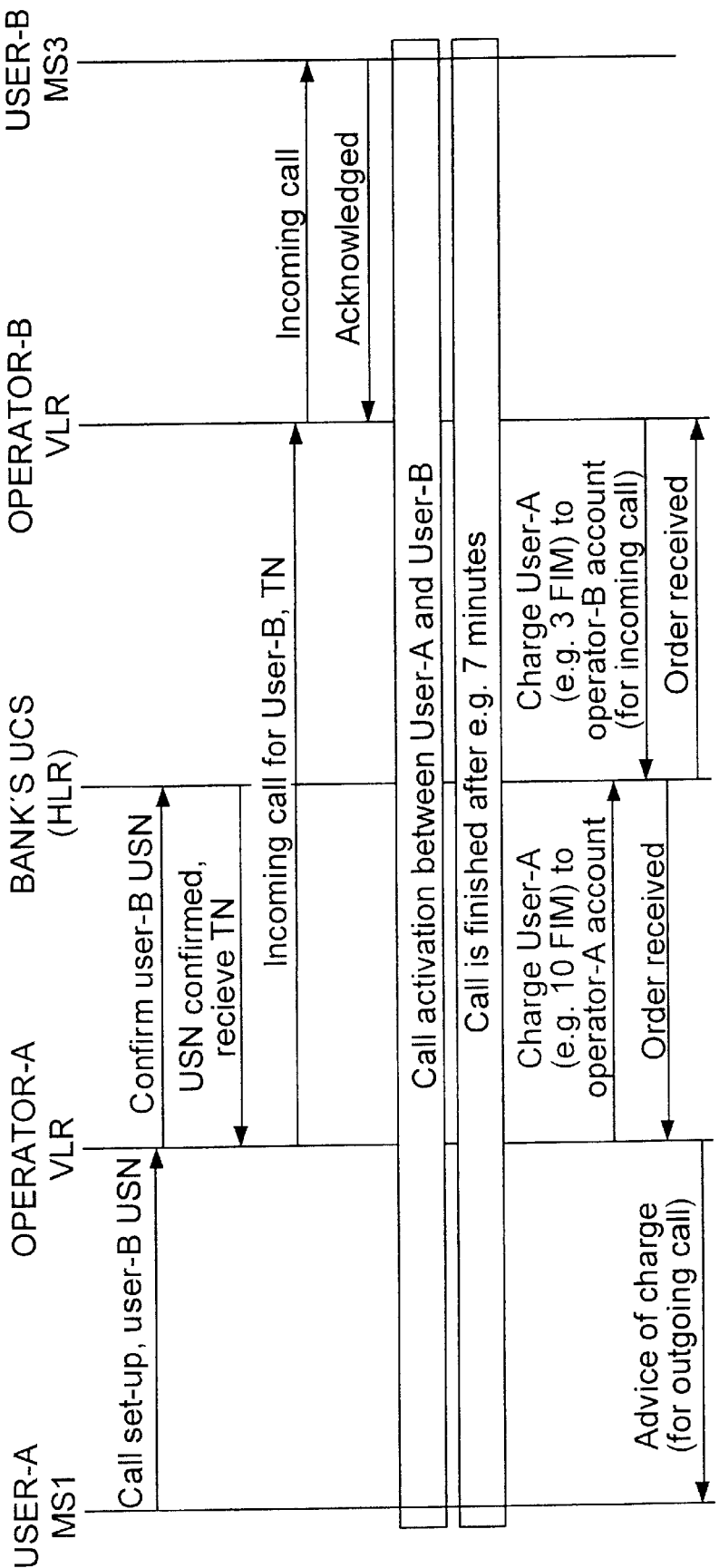
FIG. 3e shows the routing of calls between operators according to the UMSS concept.

In the UMSS, temporary users can be allocated a certain type of prepaid telecard which can be called a calls charging module CCM and which can be distributed by banks through markets. The CCM contains a temporary number TN and an amount of prepaid money in code form. This information is also stored in a THLR register, which is updated when new prepaid cards are distributed (FIG. 3b). Alternatively, in the UMSS concept, it is possible to use a SIIM card (Subscriber Identity and Invoicing Module), which can be used both as a credit card and as a conventional SIM card (Subscriber Identity Module). A SIIM card is a tele credit card which possesses characteristics of both a conventional credit card and a smart card. When a mobile user attempts an access to a mobile network, the network sends the USN included in the SIIM card to the bank. Banks either accept the registration or reject it, depending on the user's credit information (FIG. 3a). If the user uses a CCM card, the operator sends the TN included in the CCM card to the bank for confirmation. On the other hand, both CCM cards and SIIM cards may be of the same size as the current SIM cards, wherefore a credit card management part is not needed in the mobile terminal. However, all these options can be replaced by using a S-USN (secret USN), which the users can dial (together with a code, such as the PIN code in GSM mobile terminals) when the terminal is connected to the network. The S-USN may remain in the memory of the (mobile) terminal until the user disconnects (switches off) his terminal. In the UMSS concept, after each call made by the user, the network sends information to the user terminal about the amount of charge in real time.

Globally, some banks can contain the S-USNs of the users of each region (continent), or each local bank may have a UCS (including the HLR, THLR, ACU and other necessary parts), whereby the UCS comprises the USNs of the clients of the bank and other required information (e.g. equipment numbers, if required).

The Universal Mobile Subscription System (UMSS) satisfies the personal mobility needs of both the UPT and the UMTS/FPLMTS users. The UMSS architecture obviates the need for operator-specific subscriptions by the use of a unique subscription number, i.e. a universal subscription number (USN), which is accepted by all operators and by means of which each user has access to all available networks without that the operators have any roaming agreements. A subscriptionless (user-operator) communication is thus achieved. The UMSS gives the operators the possibility of charging the clients in real time or immediately after they have sold a service. The GSM system, which is the most enhanced and the most widely spread mobile system in the world, can be considered to form the basis of the UMTS/FPLMTS. The UMSS can thus be regarded as an innovative solution which satisfies the universal mobility needs of the UMTS/FPLMTS users employing the existing GSM system and its third phase (generation). The UMSS creates a total mobility concept for telecommunication.

It should be taken into account that the USN and TN (TN=Temporary Number) concepts in the UMSS concept can also be used without the real-time charging concept described above. Therefore the registration procedures depicted in FIGS. 3c and 3d, the call setup procedures depicted in FIG. 3e, and the operator/domain change procedures depicted in FIG. 3f can be regarded as interoperator procedures, e.g. between a GSM system and satellites, and between two GSM systems. The HLR of a bank can therefore be considered to be the HLR of one operator if real-time charging is not used. For example when a mobile terminal leaves the coverage area of a mobile network and enters the coverage area of a satellite telecommunication system, it does not have to register in the satellite system (operator), but it is sufficient that it requests for access to the network. This means that a user with only one subscription stored in the HLR of his home operator (FIGS. 3c, 3d, 3f) can also have access to the networks of other operators (e.g. a satellite operator) without having to perform a (new) registration operation. The visitor location register VLR of the satellite system (in this case operator A) requests the home location register HLR of the user's home operator to confirm the user's S-USN (which can be, for example, a GSM number to which the user's PIN code has been added; PIN=Personal Identity Number).

A USN comprises:
Bank code=country code: e.g. 40 or 358.
User's public number: e.g. 465192.
User's secret code (used in conjunction with the user's public number only when the user registers in the network): e.g. 0148, the public USN can thus be e.g. 40-465192 the secret USN can thus be e.g. 40-465192-0148.

It should be noted that the S-USN comprises the user's public number and each user's secret code. The secret code and the USN are mixed using an authentication algorithm in the same way as in the GSM system.

In addition, in the UMSS the bank code and the country code may be the same if only one bank stores the USNs of all the users in that country. On the other hand, no country code is needed if the system comprises several banks each of which stores the users' USNs.

A TN comprises:
Operator or bank code: e.g. 940.
It is allocated by a network (operator) to a mobile terminal during registration of the mobile terminal.
It is sent to the mobile terminal and the bank for routing incoming calls to the appropriate mobile terminal.
Each TN is allocated to one mobile terminal.
Each TN is allocated to one mobile terminal for the time the terminal is registered in the network.
The TN can be deleted from the VLR/HLR when the terminal is disconnected from the network.
Banks can also allocate TNs to subscribers.

Figure 3F:
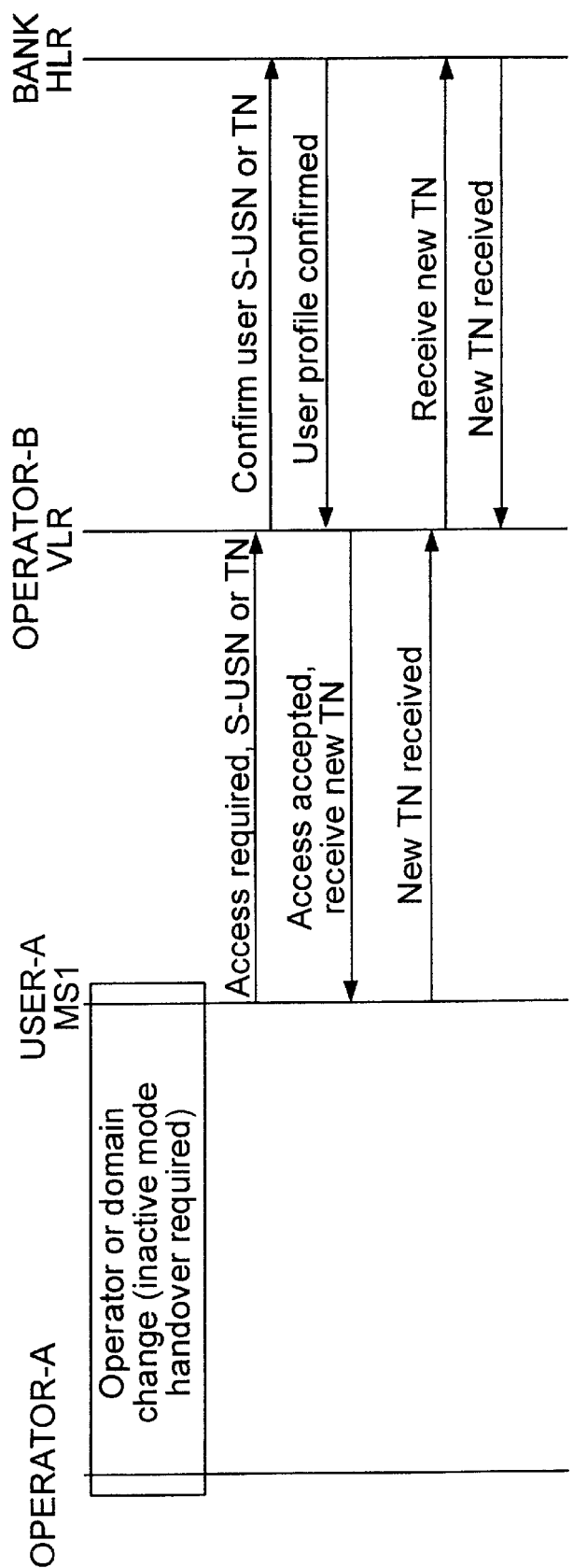
FIG. 3f shows the change of operator (domain) according to the UMSS concept.

Once a terminal is connected to and registered in a network (one operator), it does not need to re-register (deregister) when it moves to the area of another operator. The terminal only sends its secret USN (S-USN) and requests for access to the network. The operator of the system requests the users' HLR (e.g. HLR in a bank) to confirm the user's USN, which is connected with the user information. The user information will therefore be checked in connection with the S-USN, whereafter the terminal will receive an acceptance command, which gives it access to the network (FIG. 3f). This procedure makes it possible to avoid unnecessary signalling traffic between the terminal and network due to change of domain/operator. It should also be taken into account that the signalling between the VLR and the HLR is valid irrespective of whether the HLR is located in a bank or in the operator's network. The only thing that the terminal should do is to perform location updating when it changes the domain.

The drawings and the specification relating to them are intended merely to illustrate the inventive concept. In its details the mobile telecommunication subscriber system of the invention may vary within the scope of the claims. Although the invention has been described above mainly with reference to the GSM system, it can also be used in other radio systems.

What is claimed is:

1. A system for monitoring mobile telecommunication in a multioperator environment, comprising:
   at least one user control station (UCS) having a home location register (HLR) including a unique subscription number (USN) and other required subscriber data, and an account control unit (ACU) including the subscriber's credit information,
   wherein the home location register (HLR) and the account control unit (ACU) are interconnected in order for the home location register to be able to check the credit information of a calling subscriber in response to a request from a network operator and correspondingly to debit a subscriber's account on behalf of the operator by the charge of calls made.

2. The system of claim 1, wherein the user control station (UCS) further comprises a temporary home location register (THLR) for storing temporary numbers (TN) assigned to a subscriber terminal for incoming calls or when calls are routed or received in a network, the temporary number (TN) being used for roaming between the network operator and the home location register (HLR).

3. The system of claim 1, wherein the user control station (UCS) is located in a bank and the account of the subscriber is a subscriber's bank account.

4. The system of claim 1, wherein the unique subscription number (USN) is directly linked with a subscriber's bank account.

5. The system of claim 1, wherein the request for the subscriber's credit information made to the home location register (HLR) of the user control station (UCS) and informing a temporary home location register (THLR) of a temporary number (TN) are performed by a visitor location register (VLR) of the network in which a subscriber terminal makes the access request.

6. The system of claim 1, wherein upon making an access request to a network, the subscriber is identified and the subscriber's credit information is checked by reading the subscriber's unique subscription number (USN) and invoicing address (IA) from a subscriber identity and invoicing module (SIIM) card which is detachably connected to the terminal.

7. The system of claim 1, wherein upon making an access request to a network, a non-subscriber is authorized to access the network by reading a non-subscriber's temporary number (TN) stored in a prepaid calls charging module (CCM) card which is detachably connected to the terminal.

8. The system of claim 7, wherein the temporary number (TN) and sums included in the prepaid calls charging module (CCM) card are stored in a temporary home location register (THLR) of the user control station (UCS).

9. The system of claim 1, wherein one or more databases of the operator's network include an address of the appropriate user control station (UCS) for each unique subscription number (USN), and the home location register (HLR) of each relevant user control station (UCS) includes a subscriber's charging information.

10. The system of claim 1, wherein the appropriate user control station (UCS) charges the subscriber in real time without the network operator having to perform any operations.

11. The system of claim 1, wherein one or more temporary numbers (TN) can be allocated to each terminal.

12. The system of claim 11, wherein a user can register in a network by one or more terminals, each of which is allocated one or more temporary numbers (TN).

13. The system of claim 12, wherein a new temporary number (TN) is allocated, if necessary, to each terminal for various types of services.

14. The system of claim 13, wherein each temporary number (TN) assigned to a terminal may depend on the type of service.

15. The system of claim 1, wherein a user can dial a secret unique subscription number (S-USN) each time the user registers in a network by a mobile terminal or a fixed terminal.

16. The system of claim 1, wherein either a visitor location register (VLR)/home location register (HLR) of the operator or a home location register (HLR) or/and the temporary home location register (THLR) of a bank assigns temporary numbers (TN) to users each time they register in a network.

17. The system of claim 16, wherein the temporary numbers (TN) are the users' temporary subscriber numbers which can be deleted from the operator's visitor location register (VLR)/home location register (HLR) or the home location register (HLR) /temporary home location register (THLR) of the bank if the user/terminal selects another network/operator.

* * * * *